(12) United States Patent
Miller et al.

(10) Patent No.: US 10,324,213 B2
(45) Date of Patent: Jun. 18, 2019

(54) CAPACITIVE PROXIMITY SENSING

(71) Applicant: Intel Corporation, Santa Clara, CA (US)

(72) Inventors: Marcie M. Miller, Chandler, AZ (US); Roderick E. Kronschnabel, Chandler, AZ (US); Matthew J. Schneider, Chandler, AZ (US); Rene J. Sanchez, Hillsboro, OR (US); Christopher L. Ross, Phoenix, AZ (US); Ryan R. Carnaghi, Chandler, AZ (US); Keith A. Swesey, Prescott, AZ (US); Kevin Edwards, Chandler, AZ (US); Steven W. Whitehorn, Gilbert, AZ (US); Cecilia Yancy, Gilbert, AZ (US); Thomas V. Moss, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 15/387,183

(22) Filed: Dec. 21, 2016

(65) Prior Publication Data
US 2018/0059279 A1 Mar. 1, 2018

Related U.S. Application Data

(60) Provisional application No. 62/381,433, filed on Aug. 30, 2016.

(51) Int. Cl.
G01R 27/26 (2006.01)
G01V 3/08 (2006.01)

(52) U.S. Cl.
CPC .................... G01V 3/08 (2013.01)

(58) Field of Classification Search
USPC ................................... 324/658–690
See application file for complete search history.

(56) References Cited

U.S. PATENT DOCUMENTS 6,724,324 B1 4/2004 Lambert
6,960,841 B2 * 11/2005 Saitou ............... B60R 21/01532
180/273

(Continued)

FOREIGN PATENT DOCUMENTS

WO 2018044435 3/2018

OTHER PUBLICATIONS

"International Application Serial No. PCT/US2017/043902, International Search Report dated Nov. 8, 2017", 3 pgs, Search report 2017.

(Continued)

Primary Examiner — Vincent Q Nguyen
(74) Attorney, Agent, or Firm — Schwegman Lundberg & Woessner, P.A.

(57) ABSTRACT

A capacitive proximity sensor may include a proximity sensing capacitor to provide a voltage output based on a voltage input, the capacitor including a ground plane and an electrode loop capacitively coupled to the ground plane. The proximity sensor may include a processor to detect an object proximity based on a change in the voltage output. This proximity sensor provides automated detection of a person, and thereby reduces the need for a vehicle occupant or child caregiver to activate a sensor by pressing a button. The use of a capacitance-based proximity sensor reduces issues associated with fabric, clothing, or other materials separating the proximity sensor from a person.

20 Claims, 5 Drawing Sheets

(56) References Cited

U.S. PATENT DOCUMENTS

| | | | |
|---|---|---|---|
| 2009/0027068 A1* | 1/2009 | Philipp | G06F 1/3203 |
| | | | 324/678 |
| 2010/0277186 A1 | 11/2010 | Bieck et al. | |
| 2011/0209287 A1 | 9/2011 | Call et al. | |
| 2011/0216257 A1* | 9/2011 | Galstian | C08J 3/28 |
| | | | 349/33 |
| 2014/0213323 A1 | 7/2014 | Holenarsipur et al. | |
| 2014/0240164 A1 | 8/2014 | Dejean et al. | |

OTHER PUBLICATIONS

"International Application Serial No. PCT/US2017/043902, Written Opinion dated Nov. 8, 2017", 10 pgs, Search report 2017.

\* cited by examiner

CAPACITIVE PROXIMITY SENSING

CLAIM OF PRIORITY

This patent application claims the benefit of priority of U.S. Provisional Patent Application Ser. No. 62/381,433, titled "Capacitive Proximity Sensing," filed on Aug. 30, 2016, which is hereby incorporated by reference herein in its entirety.

TECHNICAL FIELD

Embodiments described herein generally relate to capacitive proximity sensors.

BACKGROUND

There is an increasing need for proximity sensing (e.g., proximity detection). In various examples, proximity sensing is used to detect occupancy, such as to detect a person seated within a vehicle or a child seated within a child vehicle seat. However, many existing solutions for proximity sensing are based on line-of-sight (e.g., camera images), an unreliable weight measurement, or physical contact with a sensor. It is desirable to provide improved proximity sensing.

DESCRIPTION OF EMBODIMENTS

A proximity detection sensor with an improved proximity detection range provides various technical solutions to the technical problems facing existing occupancy sensors. The use of a proximity sensor provides automated detection of a person, and thereby reduces the need for a vehicle occupant or child caregiver to activate a sensor by pressing a button. The geometry of the components within the proximity sensor described herein enable an improved detection range, and this improved detection range allows the proximity sensor to function properly, even in the presence of fabric, clothing, seat materials, or other materials separating the proximity sensor from a person.

Proximity detection may be used in child vehicle seats to detect the presence of a child. The proximity sensor described herein may be used to detect a child in a car seat, and may provide automatic communication with the parent or caregiver's smartphone. A proximity detection sensor may be manufactured within the chest clip on a child seatbelt. Alternatively, the proximity detection sensor may be formed into a portable device that may be placed within a seat. The materials within the proximity sensor described herein enable an improved flexibility while maintaining an improved detection range. This improved proximity sensor flexibility enables placement of the proximity sensor within a curved area, such as within a curved child seat. The proximity sensor may also be used to improve crib safety, lost child prevention, insurance rate monitoring, elderly in home monitoring, home and building monitoring, human proximity detection for robotics and functional safety, high risk area human detection, industrial seat monitoring, mechanical dispensing, pet loss-prevention, cross walk monitoring, or other applications.

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

Figure 1:
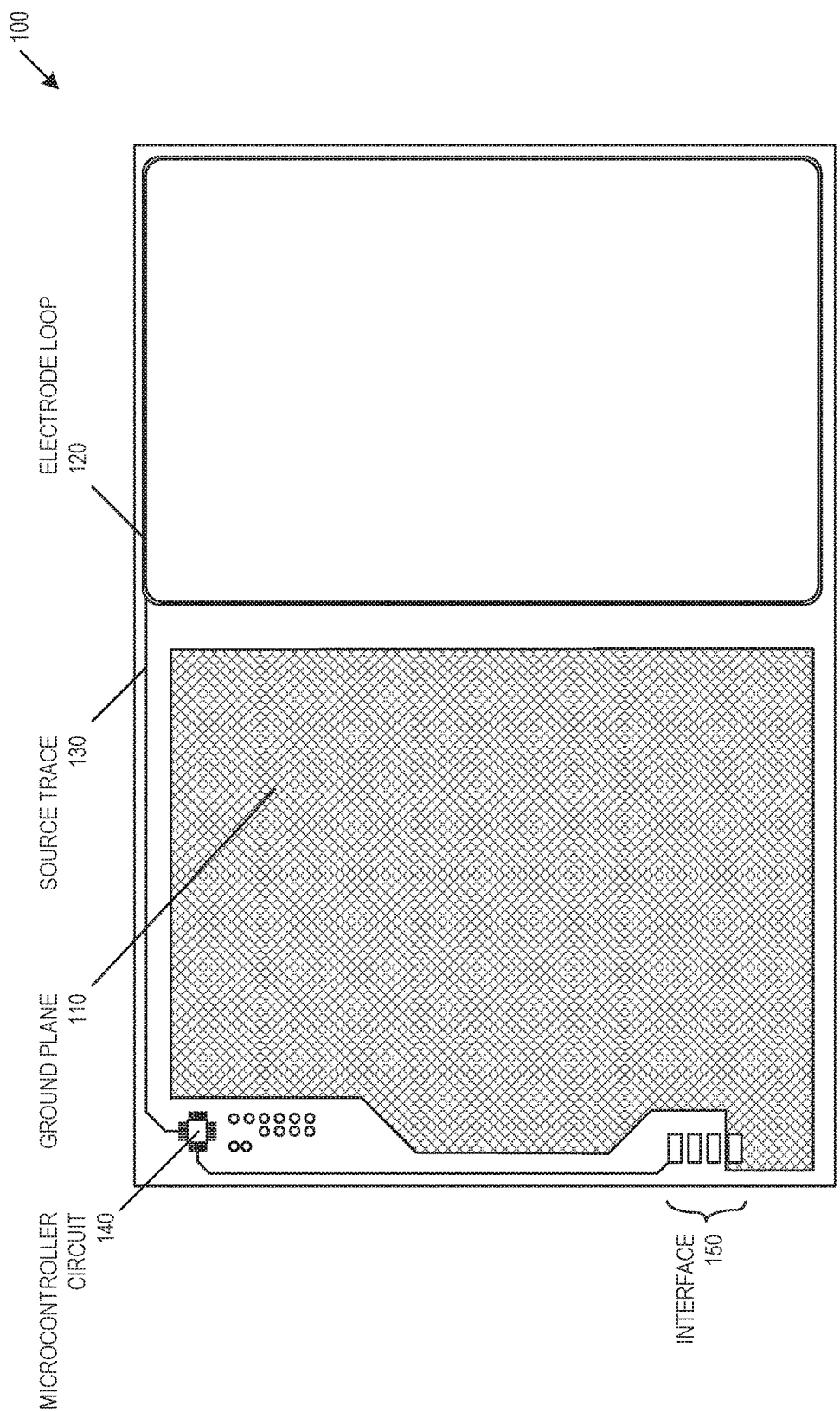
FIG. 1 is a perspective diagram of a capacitive proximity sensor, in accordance with at least one embodiment of the invention.
Figure 3:
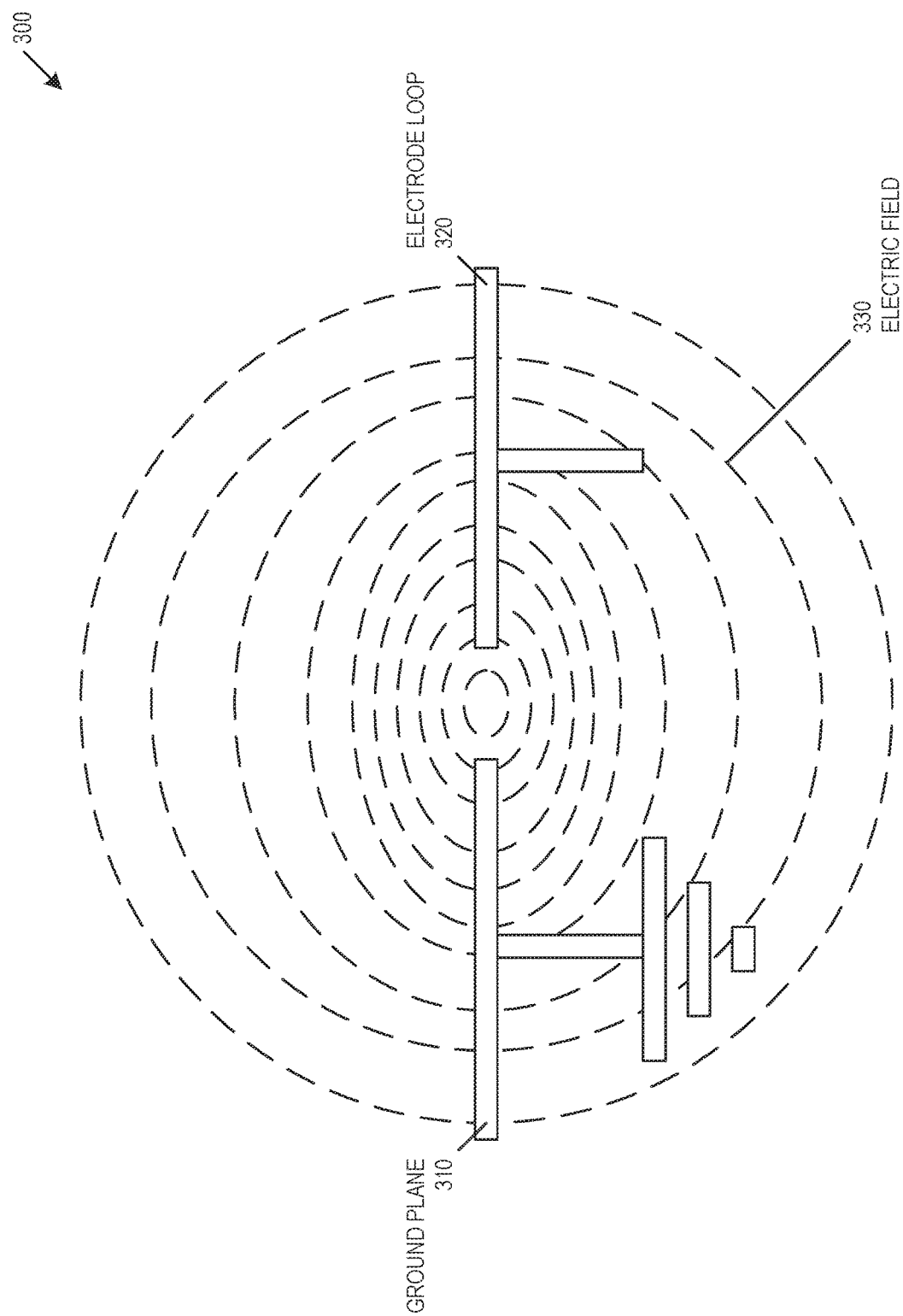
FIG. 3 is a block diagram of capacitive proximity sensor, in accordance with at least one embodiment of the invention.
Figure 4:
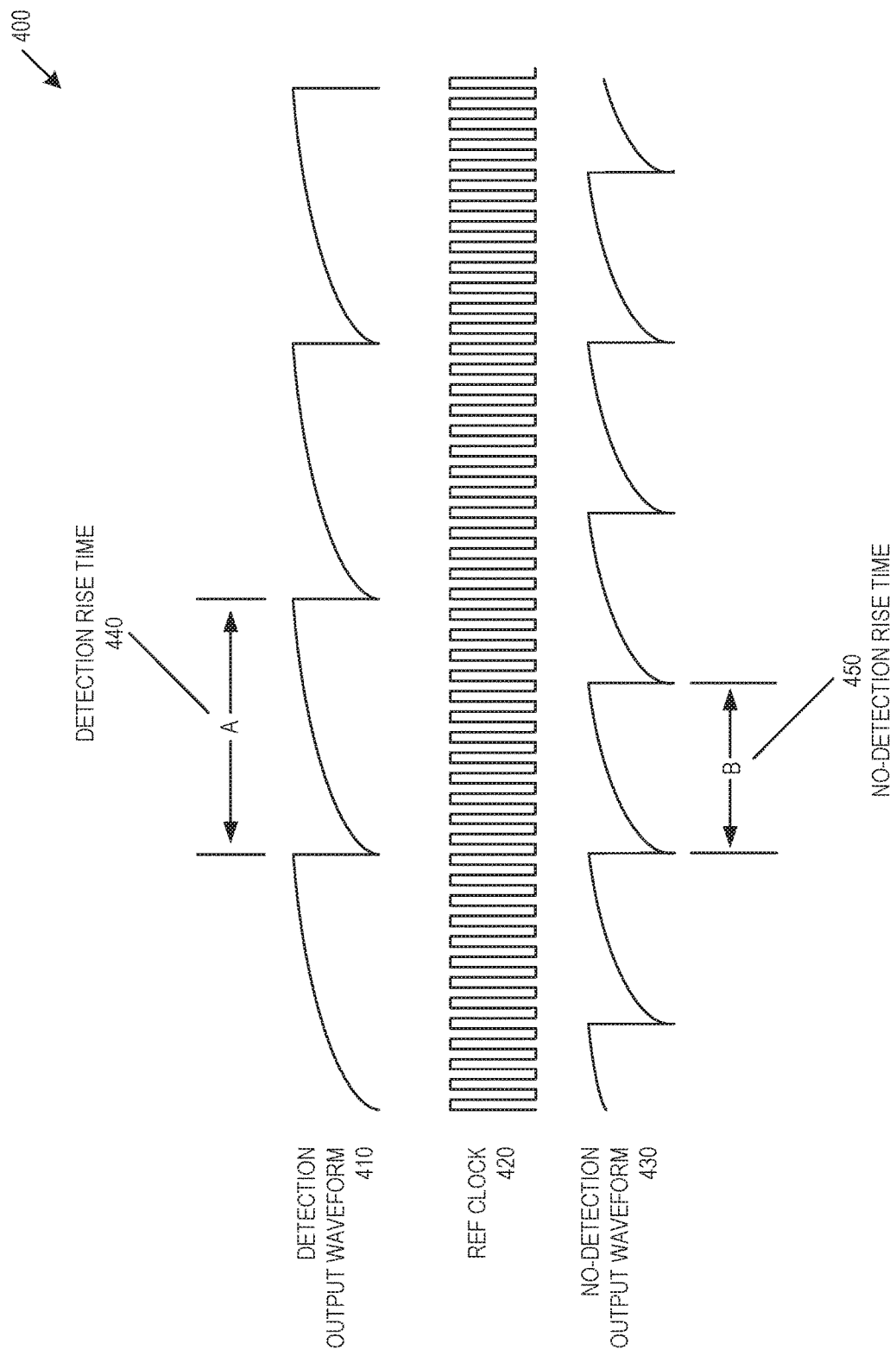
FIG. 4 is a diagram of example capacitance charging waveforms, in accordance with at least one embodiment of the invention.

FIG. 1 is a perspective diagram of a capacitive proximity sensor 100, in accordance with at least one embodiment of the invention. Proximity sensor 100 includes a ground plane 110 and an electrode loop 120. The electrode loop 120 and the ground plane 110 combine to form two plates of a dual-plate capacitor, where both plates are substantially in the same plane. Electric field lines traverse through the air between the two plates, such as shown in FIG. 3. The capacitance of the proximity sensor 100 is changed based on the interaction of bodies (e.g., proximity of a person) with the electric field lines between the plates. For example, bodies intersecting with the electric field lines effectively increase the overall capacitance of the system, and bodies removed from the electric field lines effectively decrease the overall capacitance of the system. The electrode loop 120 is conductively connected via a source trace 130 to a microcontroller circuit 140. The microcontroller circuit 140, alone or combined with other components, may detect the relative effective capacitance of the system. For example, the capacitor formed by the ground plane 110 and the electrode loop 120 may be charged and discharged repeatedly, and a statistical analysis of the measured capacitance may be used to detect proximity, such as shown in FIG. 4. The ground plane 110, microcontroller circuit 140, and other components may be connected to an interface 150. The interface 150 may receive data or provide raw proximity detection measurements, a binary proximity indication, or other data.

The geometry of the proximity sensor 100 may be selected to provide specific features, such as to provide a geometry for a specific proximity detection application. The geometry of the proximity sensor 100 may be selected to provide an increased range of proximity detection. In an example, the proximity sensor 100 may be approximately 0.1 inches thick, approximately 6 inches in width, and approximately 4 inches in height, though other sizes may be used. In an example, the proximity sensor 100 is selected to be rectangular and as large as possible for a given application, such as a selecting a rectangular sensor that will fit within a child seat. In contrast with a proximity detection sensor that detects proximity based on physical contact or very close proximity (e.g., less than 0.1 inches), proximity sensor 100 provides for proximity detection of at least 1-2 inches. This increased range allows the sensor to detect the presence of a body without requiring physical touch.

The geometry of the ground plane 110 and the geometry of the electrode loop 120 may be selected to provide specific features. The ground plane 110 provides both a grounded conductor for the proximity sensor and a grounded conductor for a microcontroller circuit 140 and other circuit components. The ground plane 110 and electrode loop 120 combine to form the dual-plate capacitive proximity sensor 100. The geometry of the ground plane 110 and the electrode loop 120 may be selected to provide electric field lines that are substantially symmetrical (e.g., substantially uniform). For example, the ground plane 110 and the electrode loop 120 may be selected to be approximately the same dimensions, or may be selected to include approximately the same surface area. Using a ground plane 110 and electrode loop 120 that are similarly sized generates a substantially uniform electric field that span the entire surface of the proximity sensor 100, such as shown in FIG. 3. The geometry of the resulting electric field increases the range and reduces the directionality of proximity detection. For example, this provides a substantially improved detection range over a ground plane surrounded by a conductive loop perimeter, whose electric field lines would form a torus (e.g., doughnut shape) that only spans the gap between the ground plane and the adjacent conductive loop perimeter.

The materials and geometry of the ground plane 110 and the geometry of the electrode loop 120 may be selected to provide specific features. The materials and geometry may be selected to provide a device that is able to bend without breaking. For example, the ground plane 110 or electrode loop 120 may be implemented using a flexible printed circuit board (PCB) substrate. The electrode loop 120 may be implemented using a wire embedded in a housing, or may be implemented as a substantially flat conductive trace with a rectangular cross-section. The capacitance-based detection may include repeated charging and discharging of the dual-plate capacitor, and the materials and cross-sectional geometry of the electrode loop 120 may be selected to provide specific electrical features. In an example, the materials and geometry are selected to provide a desired capacitor RC time constant (e.g., fast capacitor charge), which is used to measure a changing capacitance and detect proximity, such as shown in FIG. 4. In another example, the materials and geometry are selected to provide a desired current capacity that reduces power requirement while providing the substantially uniform electric field that spans the entire surface of the proximity sensor 100, such as shown in FIG. 3. In an embodiment, the electrode loop 120 is implemented using a cross-sectional area of approximately 0.0003173 in$^2$, such as using a 24-gauge wire, though other geometries may be used.

Figure 2:
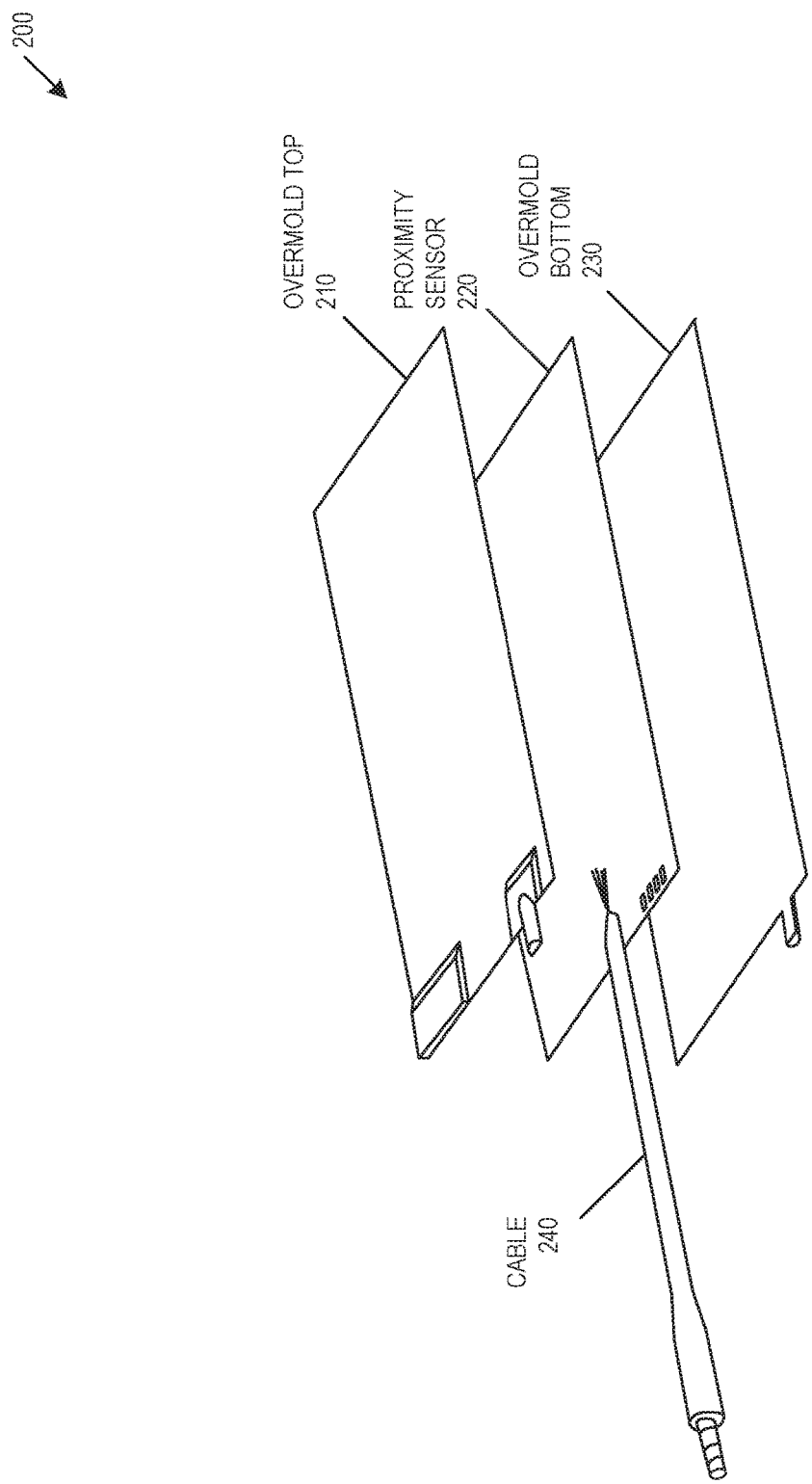
FIG. 2 is a perspective diagram of a capacitive proximity sensor with enclosure, in accordance with at least one embodiment of the invention.

FIG. 2 is a perspective diagram of a capacitive proximity sensor with enclosure 200, in accordance with at least one embodiment of the invention. The proximity sensor with enclosure 200 includes an overmold top 210, a proximity sensor 220, and an overmold bottom 230. The proximity sensor 220 may include the proximity sensor shown in FIG. 1. The materials used within the overmold top 210, the proximity sensor 220, and the overmold bottom 230 may be selected to provide a sealed and flexible device. The materials used within the overmold top 210 and the overmold bottom 230 may be selected to provide a device that is soft yet water-resistant. A cable 240 may be connected to the proximity sensor 220, which may be connected to an external device. In various embodiments, a wireless communication module may be connected as an external device.

FIG. 3 is a block diagram of capacitive proximity sensor 300, in accordance with at least one embodiment of the invention. Sensor 300 may include a ground plane 310 and an electrode loop 320, which form a capacitor. When the resultant capacitor is charged, the ground plane 310 and electrode loop 320 generate an electric field 330. The geometry of the ground plane 310 and electrode loop 320 may be selected to include relatively larger plates, while providing a device that may be small enough to be portable and to be easily installed within a vehicle seat. The use of these larger plates increases the size of the electric field 330, where the larger electric field 330 provides an increased proximity detection distance.

FIG. 4 is a diagram of example capacitance charging waveforms 400, in accordance with at least one embodiment of the invention. Capacitive charging waveforms 400 include a sensor detection output waveform 410, a reference clock waveform 420, and a sensor no-no-detection output waveform 430. When the capacitor plates shown in FIG. 1 are used in a resistor-capacitor (RC) circuit and an input charging voltage (e.g., input signal) is applied to the RC circuit, the charge time and RC time constant of the resulting RC circuit are changed by an object proximate to the sensor interacting with the electric field lines, such as an interaction caused by a body (e.g., a person or object) in close proximity with the sensor. The sensor detection output waveform 410 shows an example output voltage level based on repeated charging of the proximity sensing capacitor when there is no body interacting with the electric field lines (e.g., no object proximate to the sensor). Waveform 410 includes an RC circuit detection rise time 440 that can be measured by comparing the detection rise time 440 against a number of clock cycles in the reference clock waveform 420. Conversely, the sensor no-detection output waveform 430 shows an example voltage level based on repeated charging of the proximity sensing capacitor when there is a body that is interacting with the electric field lines (e.g., a detection of a proximate body). Waveform 430 includes an RC circuit no-detection rise time 450 that can be measured by comparing the no-detection rise time 450 against a number of clock cycles in the reference clock waveform 420. The difference between the sensor detection rise time 440 and the sensor no-detection rise time 450 may be used to identify interaction with the electric field lines. This difference may be used to detect when an object is moved to within a predetermined proximity with the sensor, any may be used to detect when an object is moved away from a predetermined proximity with the sensor.

While capacitance charging waveforms 400 show various charging rise times, a discharge time may also be used (not pictured). In an example, repeated charge and discharge cycles may be used to detect proximity. Statistical methodologies may be used to increase the sensitivity of the proximity detection by reducing measurement noise or other measurement outliers. For example, a windowed average of multiple repeated charge and discharge cycles may be used to detect proximity, or a median value of a predetermined number of samples may be used to detect proximity. In an example, a median value of 32 charge and discharge cycles may be used to detect proximity.

The detected charging and discharging times may be compared against a threshold to detect proximity. For example, a detection threshold may be used to determine when the charging and discharging times have increased sufficiently to determine that an object is in close proximity with the proximity sensor, and an object removal threshold may be used to determine when the charging and discharging times have decreased sufficiently to determine that an object is no longer in close proximity with the proximity sensor. The thresholds may be static, and may be set by a manufacturer. The thresholds may be dynamically determined based on detected charging and discharging times. For example, steady-state charging and discharging times may be determined, and the charge time threshold or discharge time threshold may be determined based on the steady-state charging and discharging times. In an example, the determined thresholds are set close enough to the steady-state values to be sensitive to a change in proximity, but far enough from the steady-state values to reduce or eliminate false detection of a proximity change. The thresholds may include a combination of static and dynamic thresholds. For example, the proximity detection threshold may be static, and once an object is detected to be in close proximity to the sensor, the object removal threshold may be dynamically set based on measured steady-state values following the proximity detection.

To save power, the proximity sensory may use a duty cycle or sleep mode to sample for proximity periodically, such as once every 5 seconds. To provide further power savings, the proximity detection may be used as a hardware interrupt or other wake-up trigger, where a change in proximity may be used to activate a communication module to inform a user of a change in proximity.

Figure 5:
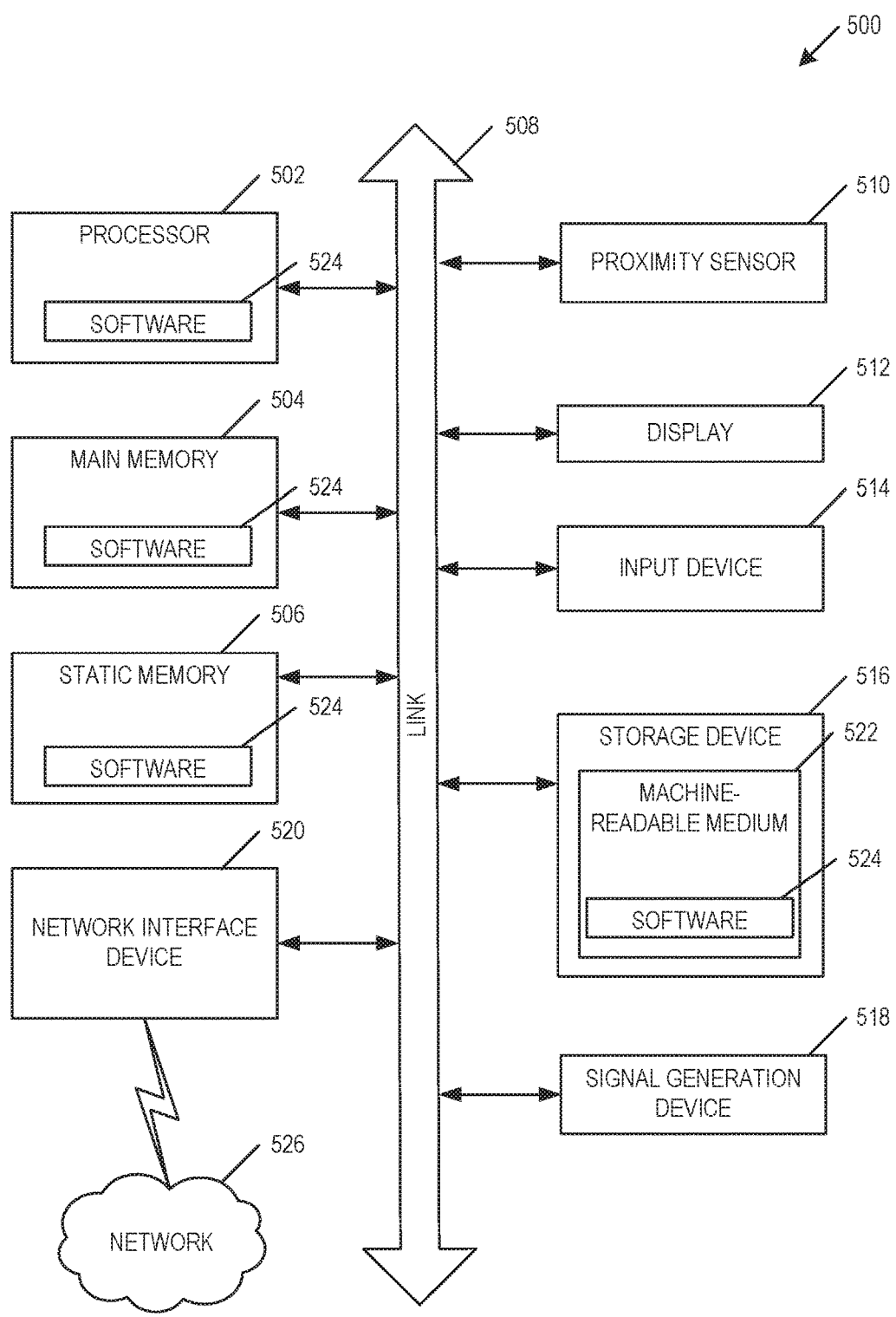
FIG. 5 is a block diagram illustrating a capacitive proximity sensor in the example form of an electronic device, according to an example embodiment.

FIG. 5 is a block diagram illustrating a capacitive proximity sensor in the example form of an electronic device 500, within which a set or sequence of instructions may be executed to cause the machine to perform any one of the methodologies discussed herein, according to an example embodiment. Electronic device 500 may also represent the devices shown in FIGS. 1-2. In alternative embodiments, the electronic device 500 operates as a standalone device or may be connected (e.g., networked) to other machines. In a networked deployment, the electronic device 500 may operate in the capacity of either a server or a client machine in server-client network environments, or it may act as a peer machine in peer-to-peer (or distributed) network environments. The electronic device 500 may be an integrated circuit (IC), a portable electronic device, a personal computer (PC), a tablet PC, a hybrid tablet, a personal digital assistant (PDA), a mobile telephone, or any electronic device 500 capable of executing instructions (sequential or otherwise) that specify actions to be taken by that machine to detect a user input. Further, while only a single electronic device 500 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus).

The electronic device 500 includes a capacitive proximity sensor 510, where the capacitive proximity sensor 510 may include plate capacitors as described above. The electronic device 500 may further include a display unit 512, where the display unit 512 may include a single component that provides a user-readable display and a protective layer, or another display type. The electronic device 500 may further include an input device 514, such as a pushbutton, a keyboard, an NFC card reader, or a user interface (UI) navigation device (e.g., a mouse or touch-sensitive input). The electronic device 500 may additionally include a storage device 516, such as a drive unit. The electronic device 500 may additionally include a signal generation device 518 to provide audible or visual feedback, such as a speaker to provide an audible feedback or one or more LEDs to provide a visual feedback. The electronic device 500 may additionally include a network interface device 520, and one or more additional sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the electronic device 500. The main memory 504, static memory 506, and the processor 502 may also constitute machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC. Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here.

Example 1 is a proximity sensing apparatus comprising: a proximity sensing capacitor to provide an output signal indicative of an object proximate to the sensing apparatus based on an input signal, the capacitor including: a ground plane; and an electrode loop capacitively coupled to the ground plane, the electrode loop disposed adjacent to and substantially coplanar with the ground plane to form an electric field in response to the input signal; and a processor to detect an object within the electric field based on a change in the output signal.

In Example 2, the subject matter of Example 1 optionally includes wherein an electrode loop geometry and a ground plane geometry are selected to provide a desired electric field geometry for the proximity sensing capacitor.

In Example 3, the subject matter of Example 2 optionally includes wherein the electrode loop geometry is selected to be substantially similar to the ground plane geometry.

In Example 4, the subject matter of any one or more of Examples 2-3 optionally include wherein the electrode loop geometry and the ground plane geometry are selected to increase a range of the electric field.

In Example 5, the subject matter of any one or more of Examples 2-4 optionally include wherein the electrode loop geometry and the ground plane geometry are configured to provide a uniform electric field for sensing the object proximate to the sensing apparatus.

In Example 6, the subject matter of any one or more of Examples 1-5 optionally include a charging device to provide the input signal to the capacitor, wherein the processor detects the object proximity based on a detected capacitor charge time.

In Example 7, the subject matter of Example 6 optionally includes wherein the processor detects the object proximity based on the detected capacitor charge time exceeding a capacitor charge time threshold.

In Example 8, the subject matter of any one or more of Examples 6-7 optionally include wherein the processor detects the object proximity based on a plurality of measured capacitor charge times.

In Example 9, the subject matter of Example 8 optionally includes wherein a number of charge times within the plurality of measured capacitor charge times is based on a predetermined charge moving window length.

In Example 10, the subject matter of any one or more of Examples 8-9 optionally include wherein the processor detects the object proximity based on the plurality of measured capacitor charge times exceeding a multiple capacitor charge time threshold.

In Example 11, the subject matter of any one or more of Examples 8-10 optionally include wherein the processor detects the object proximity based on an average charge time value of the plurality of measured capacitor charge times.

In Example 12, the subject matter of Example 11 optionally includes wherein the processor detects the object proximity based on a median charge time value of the plurality of measured capacitor charge times.

In Example 13, the subject matter of any one or more of Examples 6-12 optionally include wherein the charging device further discharges the capacitor subsequent to charging the capacitor, wherein the processor detects the object proximity based on a detected capacitor discharge time.

In Example 14, the subject matter of Example 13 optionally includes wherein the processor detects the object proximity based on the detected capacitor discharge time exceeding a capacitor discharge time threshold.

In Example 15, the subject matter of any one or more of Examples 8-14 optionally include wherein the processor detects the object proximity based on a plurality of measured capacitor discharge times.

In Example 16, the subject matter of Example 15 optionally includes wherein a number of discharge times within the plurality of measured capacitor discharge times is based on a predetermined discharge moving window length.

In Example 17, the subject matter of any one or more of Examples 15-16 optionally include wherein the processor detects the object proximity based on the plurality of measured capacitor discharge times exceeding a multiple capacitor discharge time threshold.

In Example 18, the subject matter of any one or more of Examples 11-17 optionally include wherein the processor detects the object proximity based on an average discharge time value of the plurality of measured capacitor discharge times.

In Example 19, the subject matter of any one or more of Examples 12-18 optionally include wherein the processor detects the object proximity based on a median discharge time value of the plurality of measured capacitor discharge times.

In Example 20, the subject matter of any one or more of Examples 1-19 optionally include the processor further to detect an object removal based on the change in the output signal.

In Example 21, the subject matter of Example 20 optionally includes wherein the processor detects the object removal based on the detected capacitor charge time falling below an object removal charge time threshold.

In Example 22, the subject matter of Example 21 optionally includes wherein the object removal charge time threshold is static.

In Example 23, the subject matter of Example 22 optionally includes the processor further to determine a steady-state capacitor charge time, wherein the object removal charge time threshold is dynamically adjusted based on the steady-state capacitor charge time.

In Example 24, the subject matter of Example 23 optionally includes wherein the object removal charge time threshold is dynamically adjusted based on the steady-state capacitor charge time and sufficiently different from a static object removal charge time threshold to improve object removal detection.

Example 25 is a proximity sensing method comprising: receiving an output signal indicative of an object proximate to the sensing apparatus from a proximity sensing capacitor based on an input signal, the capacitor including: a ground plane; and an electrode loop capacitively coupled to the ground plane, the electrode loop disposed adjacent to and substantially coplanar with the ground plane to form an electric field in response to the input signal; and detecting an object within the electric field based on a change in the output signal.

In Example 26, the subject matter of Example 25 optionally includes wherein an electrode loop geometry and a ground plane geometry are selected to provide a desired electric field geometry for the proximity sensing capacitor.

In Example 27, the subject matter of Example 26 optionally includes wherein the electrode loop geometry is selected to be substantially similar to the ground plane geometry.

In Example 28, the subject matter of any one or more of Examples 26-27 optionally include wherein the electrode loop geometry and the ground plane geometry are selected to increase a range of the electric field.

In Example 29, the subject matter of any one or more of Examples 26-28 optionally include wherein the electrode loop geometry and the ground plane geometry are configured to provide a uniform electric field for sensing the object proximate to the sensing apparatus.

In Example 30, the subject matter of any one or more of Examples 25-29 optionally include providing the input signal from a charging device to the capacitor; and detecting the object proximity based on a detected capacitor charge time.

In Example 31, the subject matter of Example 30 optionally includes detecting the object proximity based on the detected capacitor charge time exceeding a capacitor charge time threshold.

In Example 32, the subject matter of any one or more of Examples 30-31 optionally include detecting the object proximity based on a plurality of measured capacitor charge times.

In Example 33, the subject matter of Example 32 optionally includes wherein a number of charge times within the plurality of measured capacitor charge times is based on a predetermined charge moving window length.

In Example 34, the subject matter of any one or more of Examples 32-33 optionally include detecting the object proximity based on the plurality of measured capacitor charge times exceeding a multiple capacitor charge time threshold.

In Example 35, the subject matter of any one or more of Examples 32-34 optionally include detecting the object proximity based on an average charge time value of the plurality of measured capacitor charge times.

In Example 36, the subject matter of Example 35 optionally includes detecting the object proximity based on a median charge time value of the plurality of measured capacitor charge times.

In Example 37, the subject matter of any one or more of Examples 30-36 optionally include discharging the capacitor subsequent to charging the capacitor; and detecting the object proximity based on a detected capacitor discharge time.

In Example 38, the subject matter of Example 37 optionally includes detecting the object proximity based on the detected capacitor discharge time exceeding a capacitor discharge time threshold.

In Example 39, the subject matter of any one or more of Examples 32-38 optionally include detecting the object proximity based on a plurality of measured capacitor discharge times.

In Example 40, the subject matter of Example 39 optionally includes wherein a number of discharge times within the plurality of measured capacitor discharge times is based on a predetermined discharge moving window length.

In Example 41, the subject matter of any one or more of Examples 39-40 optionally include detecting the object proximity based on the plurality of measured capacitor discharge times exceeding a multiple capacitor discharge time threshold.

In Example 42, the subject matter of any one or more of Examples 35-41 optionally include detecting the object proximity based on an average discharge time value of the plurality of measured capacitor discharge times.

In Example 43, the subject matter of any one or more of Examples 36-42 optionally include detecting the object proximity based on a median discharge time value of the plurality of measured capacitor discharge times.

In Example 44, the subject matter of any one or more of Examples 25-43 optionally include detecting an object removal based on the change in the output signal.

In Example 45, the subject matter of Example 44 optionally includes detecting the object removal based on the detected capacitor charge time falling below an object removal charge time threshold.

In Example 46, the subject matter of Example 45 optionally includes wherein the object removal charge time threshold is static.

In Example 47, the subject matter of Example 46 optionally includes determining a steady-state capacitor charge time; and dynamically adjusting the object removal charge time threshold based on the steady-state capacitor charge time.

In Example 48, the subject matter of Example 47 optionally includes dynamically adjusting the object removal charge time threshold based on the steady-state capacitor charge time and sufficiently different from a static object removal charge time threshold to improve object removal detection.

Example 49 is at least one machine-readable medium including instructions, which when executed by a computing system, cause the computing system to perform any of the methods of Examples 25-44.

Example 50 is an apparatus comprising means for performing any of the methods of Examples 25-44.

Example 51 is at least one machine-readable storage medium, comprising a plurality of instructions that, responsive to being executed with processor circuitry of a computer-controlled device, cause the computer-controlled device to: receive an output signal indicative of an object proximate to the sensing apparatus from a proximity sensing capacitor based on an input signal, the capacitor including: a ground plane, and an electrode loop capacitively coupled to the ground plane, the electrode loop disposed adjacent to and substantially coplanar with the ground plane to form an electric field in response to the input signal; and detect an object within the electric field based on a change in the output signal.

In Example 52, the subject matter of Example 51 optionally includes wherein an electrode loop geometry and a ground plane geometry are selected to provide a desired electric field geometry for the proximity sensing capacitor.

In Example 53, the subject matter of Example 52 optionally includes wherein the electrode loop geometry is selected to be substantially similar to the ground plane geometry.

In Example 54, the subject matter of any one or more of Examples 52-53 optionally include wherein the electrode loop geometry and the ground plane geometry are selected to increase a range of the electric field.

In Example 55, the subject matter of any one or more of Examples 52-54 optionally include wherein the electrode loop geometry and the ground plane geometry are configured to provide a uniform electric field for sensing the object proximate to the sensing apparatus.

In Example 56, the subject matter of any one or more of Examples 51-55 optionally include the plurality of instructions further causing the computer-controlled device to: provide the input signal from a charging device to the capacitor; and detect the object proximity based on a detected capacitor charge time.

In Example 57, the subject matter of Example 56 optionally includes the plurality of instructions further causing the computer-controlled device to detect the object proximity based on the detected capacitor charge time exceeding a capacitor charge time threshold.

In Example 58, the subject matter of any one or more of Examples 56-57 optionally include the plurality of instructions further causing the computer-controlled device to detect the object proximity based on a plurality of measured capacitor charge times.

In Example 59, the subject matter of Example 58 optionally includes wherein a number of charge times within the plurality of measured capacitor charge times is based on a predetermined charge moving window length.

In Example 60, the subject matter of any one or more of Examples 58-59 optionally include the plurality of instructions further causing the computer-controlled device to detect the object proximity based on the plurality of measured capacitor charge times exceeding a multiple capacitor charge time threshold.

In Example 61, the subject matter of any one or more of Examples 58-60 optionally include the plurality of instructions further causing the computer-controlled device to detect the object proximity based on an average charge time value of the plurality of measured capacitor charge times.

In Example 62, the subject matter of Example 61 optionally includes the plurality of instructions further causing the computer-controlled device to detect the object proximity based on a median charge time value of the plurality of measured capacitor charge times.

In Example 63, the subject matter of any one or more of Examples 56-62 optionally include the plurality of instructions further causing the computer-controlled device to: discharge the capacitor subsequent to charging the capacitor; and detect the object proximity based on a detected capacitor discharge time.

In Example 64, the subject matter of Example 63 optionally includes the plurality of instructions further causing the computer-controlled device to detect the object proximity based on the detected capacitor discharge time exceeding a capacitor discharge time threshold.

In Example 65, the subject matter of any one or more of Examples 58-64 optionally include the plurality of instructions further causing the computer-controlled device to detect the object proximity based on a plurality of measured capacitor discharge times.

In Example 66, the subject matter of Example 65 optionally includes wherein a number of discharge times within the plurality of measured capacitor discharge times is based on a predetermined discharge moving window length.

In Example 67, the subject matter of any one or more of Examples 65-66 optionally include the plurality of instructions further causing the computer-controlled device to detect the object proximity based on the plurality of measured capacitor discharge times exceeding a multiple capacitor discharge time threshold.

In Example 68, the subject matter of any one or more of Examples 61-67 optionally include the plurality of instructions further causing the computer-controlled device to detect the object proximity based on an average discharge time value of the plurality of measured capacitor discharge times.

In Example 69, the subject matter of any one or more of Examples 62-68 optionally include the plurality of instructions further causing the computer-controlled device to detect the object proximity based on a median discharge time value of the plurality of measured capacitor discharge times.

In Example 70, the subject matter of any one or more of Examples 51-69 optionally include the plurality of instructions further causing the computer-controlled device to detect an object removal based on the change in the output signal.

In Example 71, the subject matter of Example 70 optionally includes the plurality of instructions further causing the computer-controlled device to detect the object removal based on the detected capacitor charge time falling below an object removal charge time threshold.

In Example 72, the subject matter of Example 71 optionally includes wherein the object removal charge time threshold is static.

In Example 73, the subject matter of Example 72 optionally includes the plurality of instructions further causing the computer-controlled device to: determine a steady-state capacitor charge time; and dynamically adjust the object removal charge time threshold based on the steady-state capacitor charge time.

In Example 74, the subject matter of Example 73 optionally includes the plurality of instructions further causing the computer-controlled device to adjust the object removal charge time threshold dynamically based on the steady-state capacitor charge time and sufficiently different from a static object removal charge time threshold to improve object removal detection.

Example 75 is a proximity sensing apparatus comprising: means for receiving an output signal indicative of an object proximate to the sensing apparatus from a proximity sensing capacitor based on an input signal, the capacitor including: a ground plane; and an electrode loop capacitively coupled to the ground plane, the electrode loop disposed adjacent to and substantially coplanar with the ground plane to form an electric field in response to the input signal; and means for detecting an object within the electric field based on a change in the output signal.

In Example 76, the subject matter of Example 75 optionally includes wherein an electrode loop geometry and a ground plane geometry are selected to provide a desired electric field geometry for the proximity sensing capacitor.

In Example 77, the subject matter of Example 76 optionally includes wherein the electrode loop geometry is selected to be substantially similar to the ground plane geometry.

In Example 78, the subject matter of any one or more of Examples 76-77 optionally include wherein the electrode loop geometry and the ground plane geometry are selected to increase a range of the electric field.

In Example 79, the subject matter of any one or more of Examples 76-78 optionally include wherein the electrode loop geometry and the ground plane geometry are configured to provide a uniform electric field for sensing the object proximate to the sensing apparatus.

In Example 80, the subject matter of any one or more of Examples 75-79 optionally includes means for providing the input signal from a charging device to the capacitor; and means for detecting the object proximity based on a detected capacitor charge time.

In Example 81, the subject matter of Example 80 optionally includes means for detecting the object proximity based on the detected capacitor charge time exceeding a capacitor charge time threshold.

In Example 82, the subject matter of any one or more of Examples 80-81 optionally include means for detecting the object proximity based on a plurality of measured capacitor charge times.

In Example 83, the subject matter of Example 82 optionally includes wherein a number of charge times within the plurality of measured capacitor charge times is based on a predetermined charge moving window length.

In Example 84, the subject matter of any one or more of Examples 82-83 optionally include means for detecting the object proximity based on the plurality of measured capacitor charge times exceeding a multiple capacitor charge time threshold.

In Example 85, the subject matter of any one or more of Examples 82-84 optionally include means for detecting the object proximity based on an average charge time value of the plurality of measured capacitor charge times.

In Example 86, the subject matter of Example 85 optionally includes means for detecting the object proximity based on a median charge time value of the plurality of measured capacitor charge times.

In Example 87, the subject matter of any one or more of Examples 80-86 optionally include means for discharging the capacitor subsequent to charging the capacitor; and means for detecting the object proximity based on a detected capacitor discharge time.

In Example 88, the subject matter of Example 87 optionally includes means for detecting the object proximity based on the detected capacitor discharge time exceeding a capacitor discharge time threshold.

In Example 89, the subject matter of any one or more of Examples 82-88 optionally include means for detecting the object proximity based on a plurality of measured capacitor discharge times.

In Example 90, the subject matter of Example 89 optionally includes wherein a number of discharge times within the plurality of measured capacitor discharge times is based on a predetermined discharge moving window length.

In Example 91, the subject matter of any one or more of Examples 89-90 optionally include means for detecting the object proximity based on the plurality of measured capacitor discharge times exceeding a multiple capacitor discharge time threshold.

In Example 92, the subject matter of any one or more of Examples 85-91 optionally include means for detecting the object proximity based on an average discharge time value of the plurality of measured capacitor discharge times.

In Example 93, the subject matter of any one or more of Examples 86-92 optionally include means for detecting the object proximity based on a median discharge time value of the plurality of measured capacitor discharge times.

In Example 94, the subject matter of any one or more of Examples 75-93 optionally include means for detecting an object removal based on the change in the output signal.

In Example 95, the subject matter of Example 94 optionally includes means for detecting the object removal based on the detected capacitor charge time falling below an object removal charge time threshold.

In Example 96, the subject matter of Example 95 optionally includes wherein the object removal charge time threshold is static.

In Example 97, the subject matter of Example 96 optionally includes means for determining a steady-state capacitor charge time; and means for dynamically adjusting the object removal charge time threshold based on the steady-state capacitor charge time.

In Example 98, the subject matter of Example 97 optionally includes means for adjusting the object removal charge time threshold dynamically based on the steady-state capacitor charge time and sufficiently different from a static object removal charge time threshold to improve object removal detection.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A proximity sensing apparatus comprising:
a proximity sensing capacitor to provide an output signal indicative of an object proximate to the sensing apparatus based on an input signal, the capacitor including:
a ground plane; and
an electrode loop capacitively coupled to the ground plane, the electrode loop disposed adjacent to and substantially coplanar with the ground plane to form an electric field in response to the input signal; and
a processor electrically coupled to the proximity sensing capacitor, the processor to detect an object within the electric field based on a change in the output signal.

2. The apparatus of claim 1, wherein an electrode loop geometry and a ground plane geometry are selected to provide a desired electric field geometry for the proximity sensing capacitor.

3. The apparatus of claim 2, wherein the electrode loop geometry and the ground plane geometry are selected to be substantially similarly sized to generate a substantially uniform electric field.

4. The apparatus of claim 2, wherein the electrode loop geometry and the ground plane geometry are configured to provide a uniform electric field for sensing the object proximate to the sensing apparatus.

5. The apparatus of claim 1, further including a charging device to provide the input signal to the capacitor, wherein the processor detects the object proximity based on a detected capacitor charge time.

6. The apparatus of claim 5, wherein the processor detects the object proximity based on the detected capacitor charge time exceeding a capacitor charge time threshold.

7. The apparatus of claim 5, wherein the processor detects the object proximity based on a plurality of measured capacitor charge times.

8. The apparatus of claim 7, wherein a number of charge times within the plurality of measured capacitor charge times is based on a predetermined charge moving window length.

9. The apparatus of claim 7, wherein the processor detects the object proximity based on an average charge time value of the plurality of measured capacitor charge times.

10. The apparatus of claim 1, the processor further to detect an object removal based on the change in the output signal.

11. A proximity sensing method comprising:
receiving an output signal from a proximity sensing apparatus, the output signal indicative of an object proximate to the proximity sensing apparatus, the proximity sensing apparatus including a proximity sensing capacitor, the capacitor including:
a ground plane; and
an electrode loop capacitively coupled to the ground plane, the electrode loop disposed adjacent to and substantially coplanar with the ground plane to form an electric field in response to an input signal; and
detecting an object within the electric field based on a change in the output signal.

12. The method of claim 11, wherein an electrode loop geometry and a ground plane geometry are selected to provide a desired electric field geometry for the proximity sensing capacitor.

13. The method of claim 12, wherein the electrode loop geometry is selected to be substantially similar to the ground plane geometry.

14. The method of claim 11, further including:
providing the input signal from a charging device to the capacitor; and
detecting the object proximity based on a detected capacitor charge time.

15. At least one non-transitory machine-readable storage medium, comprising a plurality of instructions that, responsive to being executed with processor circuitry of a computer-controlled device, cause the computer-controlled device to:
receive an output signal from a proximity sensing apparatus, the output signal indicative of an object proximate to the proximity sensing apparatus, the proximity sensing apparatus including a proximity sensing capacitor, the capacitor including:
a ground plane; and
an electrode loop capacitively coupled to the ground plane, the electrode loop disposed adjacent to and substantially coplanar with the ground plane to form an electric field in response to an input signal; and
detect an object within the electric field based on a change in the output signal.

16. The non-transitory machine-readable storage medium of claim 15, wherein an electrode loop geometry and a ground plane geometry are selected to provide a desired electric field geometry for the proximity sensing capacitor.

17. The non-transitory machine-readable storage medium of claim 16, wherein the electrode loop geometry is selected to be substantially similar to the ground plane geometry.

18. The non-transitory machine-readable storage medium of claim 15, the plurality of instructions further causing the computer-controlled device to:
provide the input signal from a charging device to the capacitor; and
detect the object proximity based on a detected capacitor charge time.

19. The non-transitory machine-readable storage medium of claim 18, the plurality of instructions further causing the computer-controlled device to:
discharge the capacitor subsequent to charging the capacitor; and
detect the object proximity based on a detected capacitor discharge time.

20. The non-transitory machine-readable storage medium of claim 15, the plurality of instructions further causing the computer-controlled device to detect an object removal based on the change in the output signal.

* * * * *